United States Patent
Richter

(10) Patent No.: US 9,682,769 B2
(45) Date of Patent: Jun. 20, 2017

(54) HIGH LIFT SYSTEM FOR AN AIRCRAFT WITH TWO SEPARATE DRIVE UNITS

(71) Applicant: AIRBUS OPERATIONS GMBH, Hamburg (DE)

(72) Inventor: Martin Richter, Bremen (DE)

(73) Assignee: Airbus Operations GmbH (DE)

(*) Notice: Subject to any disclaimer, the term of this patent is extended or adjusted under 35 U.S.C. 154(b) by 321 days.

(21) Appl. No.: 13/832,483

(22) Filed: Mar. 15, 2013

(65) Prior Publication Data
US 2014/0138480 A1    May 22, 2014

Related U.S. Application Data

(63) Continuation of application No. PCT/EP2011/067407, filed on Oct. 5, 2011.
(Continued)

(30) Foreign Application Priority Data

Oct. 5, 2010 (DE) .................. 10 2010 047 512

(51) Int. Cl.
*B64C 13/28* (2006.01)
*B64C 13/30* (2006.01)
*B64D 45/00* (2006.01)

(52) U.S. Cl.
CPC .............. *B64C 13/28* (2013.01); *B64C 13/30* (2013.01); *B64D 45/0005* (2013.01); *B64D 2045/001* (2013.01); *Y02T 50/44* (2013.01)

(58) Field of Classification Search
CPC ..... B64C 13/28; B64C 13/30; B64D 45/0005; B64D 2045/001; Y02T 50/44
See application file for complete search history.

(56) References Cited

U.S. PATENT DOCUMENTS 5,686,907 A    11/1997 Bedell et al.
6,231,012 B1    5/2001 Cacciola et al.
(Continued)

FOREIGN PATENT DOCUMENTS

EP    1052162 A2    11/2000
EP    1052168 A2    11/2000
WO    2009135653    11/2009

OTHER PUBLICATIONS

International Searching Authority, Written Opinion dated Dec. 30, 2011, for International Application No. PCT/EP2011/067407.
(Continued)

*Primary Examiner* — Valentina Xavier
(74) *Attorney, Agent, or Firm* — Lerner, David, Littenberg, Krumholz & Mentlik, LLP

(57) ABSTRACT

A high-lift system on a wing of an aircraft is provided. The wing includes a right-hand and a left-hand wing half with movably held high-lift flaps and the right-hand and left-hand wing half are attached to an aircraft fuselage, thus forming a wing root. Each wing half in a region in close proximity to the wing root, includes a drive unit. In each case this drive unit is joined to a transmission shaft mechanically connected to the respective drive unit, which transmission shaft extends from the drive unit in the direction of the end of the respective wing half and is designed to mechanically move the high-lift flaps arranged in the respective wing half. By means of such an arrangement it is possible to do without deflection gear arrangements from a central drive unit to the individual wing halves.

11 Claims, 4 Drawing Sheets

Related U.S. Application Data

(60) Provisional application No. 61/389,961, filed on Oct. 5, 2010.

(56) References Cited

U.S. PATENT DOCUMENTS

| | | | |
|---|---|---|---|
| 6,443,034 | B1 | 9/2002 | Capewell et al. |
| 7,048,234 | B2 | 5/2006 | Recksiek et al. |
| 7,556,224 | B2 * | 7/2009 | Johnson et al. ............... 244/175 |
| 8,746,614 | B2 * | 6/2014 | Heintjes ........................ 244/99.3 |
| 8,814,085 | B2 * | 8/2014 | Richter ................... B64C 13/42 244/211 |
| 2004/0200928 | A1 | 10/2004 | Degenholtz et al. |
| 2005/0151027 | A1 | 7/2005 | Recksiek et al. |
| 2006/0289696 | A1 * | 12/2006 | Hanlon et al. ............... 244/35 R |
| 2010/0100355 | A1 | 4/2010 | Marx et al. |
| 2011/0062282 | A1 | 3/2011 | Richter et al. |

OTHER PUBLICATIONS

International Searching Authority, International Search Report dated Dec. 30, 2011, for International Application No. PCT/EP2011/067407.

State Intellectual Property Office of the Peoples' Republic of China, Office Action in Chinese Patent Application No. 201180047974.X, mailed Aug. 22, 2014.

State Intellectual Property Office of the Peoples' Republic of China, Office Action in Chinese Patent Application No. 201180047974.X, mailed Apr. 20, 2015.

German Patent and Trade Mark Office, German Office Action for German Patent Application No. 10 2010 047 512.2, mailed Feb. 24, 2014.

\* cited by examiner

HIGH LIFT SYSTEM FOR AN AIRCRAFT WITH TWO SEPARATE DRIVE UNITS

CROSS-REFERENCE TO RELATED APPLICATIONS

This is a continuation of International Application No. PCT/EP2011/067407, filed Oct. 5, 2011, which application claims priority to German Patent Application No. 10 2010 047 512.2, filed Oct. 5, 2010 and to U.S. Provisional Patent Application No. 61/389,961, filed Oct. 5, 2010, which are each incorporated herein by reference in their entirety.

TECHNICAL FIELD

The technical field relates to a high-lift system for an aircraft comprising a multitude of movable lift flaps and to an aircraft comprising a high-lift system with a multitude of movable flaps.

BACKGROUND

Many high-lift systems with movable flaps in civil and military aircraft are driven by way of a central drive unit located in the middle of an aircraft fuselage, which drive unit is also known as a power control unit, PCU, a transmission shaft train and local mechanical actuator devices on corresponding flap support stations of the movable flaps. The actuator devices are frequently designed as linear spindle drives or rotary drives. In addition, these known high-lift systems comprise safety brakes, for example so-called "wing tip brakes" (WTB), which go into action in certain instances. Usually, controlling and monitoring these high-lift systems takes place by means of digital on-board computers of the aircraft, for example by means of a so-called "slat flap control computer" (SFCC).

Based on the central drive unit, synchronicity between individual flaps of a left-hand and a right-hand wing half, as well as between the flaps of a wing half, is ensured mechanically by means of the transmission shaft train that extends through the fuselage and along the support stations. This transmission shaft train usually comprises a multitude of bearings, multiple tooth elements, universal joints and, for the purpose of bridging large changes in direction, in particular relating to the region from the fuselage centre to the wing halves or to the wing root region, corresponding angular gear arrangements. The central drive unit for flaps on a leading edge of the wing and for flaps on a trailing edge of the wing is, for example in the case of aircraft made by AIRBUS, installed in close proximity to the fuselage center line in the landing gear bay or in the region of the wing-fuselage fairing ("belly fairing"). In each case a central drive unit for the flaps of the leading edge of the wing, and a central drive unit for the flaps of the trailing edge of the wing are used. The respective central drive unit is usually driven by two motors that are active in parallel, with the drive output of said motors being transferred to the respective transmission shaft system by way of a differential, wherein several drive modes exist.

EP 1 462 361 B1 and U.S. Pat. No. 7,048,234 B2 show a flap system on the wing of a fixed wing aircraft, in which system flaps are coupled to synchronized wing-internal individual drives.

In addition, other objects, desirable features and characteristics will become apparent from the subsequent summary and detailed description, and the appended claims, taken in conjunction with the accompanying drawings and this background.

SUMMARY

Arranging the central drive unit in the region of the fuselage centre for a respective flap system on the leading edge of the wing and on the trailing edge of the wing, respectively, results in very considerable installation expenditure with a multitude of mechanical components such as transmission shafts, universal joints, bearings and bearing positions, as well as angular gear arrangements, in order to first bring the shaft output of the drive unit to the wing halves or to the region of the wing root. While torque transmission within the fuselage usually requires very substantial changes in angle, torque transmission within the wing halves takes place in quite a rectilinear manner.

From the point of view of expenditure, weight and, in particular, control technology, synchronized coupling of flaps comprising individual drives is more involved and provides lower overall reliability when compared to coupling all the flaps that are to be driven by means of a shared transmission shaft.

The present disclosure provides a high-lift system for an aircraft, which system can accomplish simple drive of flaps on a leading edge of the wing and flaps on a trailing edge of the wing, respectively, with as few pronounced changes in angle as possible, without in this arrangement increasing the weight, and in particular without reducing the reliability of the aircraft.

A high-lift system on a wing of an aircraft, which wing comprises a right-hand and a left-hand wing half with movably held high-lift flaps, is attached to an aircraft fuselage, thus forming a wing root. According to various aspects of the present disclosure, in each wing half in a region in close proximity to the wing root a drive unit is arranged, which in each case is joined to a transmission shaft mechanically connected to the respective drive unit. Said transmission shaft extends from the drive unit in the direction of the end of the respective wing half and is designed to mechanically move all the high-lift flaps arranged in the respective wing half.

According to the present disclosure, thus two drive units that are non-central and that are operable independently of each other are used, which replace a central drive unit and its necessary deflections into the wing halves. This provides an advantage in that the displacement of the drive units to a region in close proximity to the wing root obviates the need for expensive displacement of the transmission shaft from the fuselage center to the wing halves or to the wing root. The drive units that have spatially been displaced to the wing root region can easily and advantageously be installed, in particular in the case of aircraft comprising fuselage landing gear, because in this arrangement there usually is sufficient installation space, in particular for a trailing edge flap system. As a result of the displacement of the drive units approximately a quarter of the transmission shafts of conventional transmission shaft systems that are centrally driven and that emanate from the fuselage center can be done without. Furthermore, there is no need to provide the associated angular gear arrangements that are usually installed in order to bridge the large changes in angle of the transmission in the fuselage region. Doing without these mechanical drive components such as transmission shafts, universal joints and angular gear arrangements, as well as doing without the associated structural connections or bearings in this region, potentially results in reduction in the weight of the overall system, in other words in a weight-optimized drive both in relation to the high-lift flaps on a leading edge of the wing, and in relation to the high-lift flaps on a trailing edge of the wing. The overall weight of the now doubled number of drive units is potentially lower than the overall weight of a central drive unit and the necessary deflection means to the wing halves. Furthermore, it should be taken into account that each of the two drive units needs to cope with a significantly lower mechanical load than the central drive unit so that this results in smaller dimensioning which has a positive effect on the overall weight achieved.

The present disclosure provides a further advantage in that it involves a significantly reduced installation effort, in particular because no transmission installation in an already confined installation space, which is already used by many other systems, in the landing gear bay and in a wing-to-belly transition region is required.

At this stage it should be pointed out that it is also possible to install several high-lift systems according to the present disclosure in order to replace several drive units and transmission shaft trains. It is imaginable for a high-lift system according to the present disclosure to be equipped with leading edge flaps, and for a high-lift system according to the present disclosure to be equipped with trailing edge flaps and to be installed on a wing. It is further pointed out, that the expression "flap" includes trailing edge flaps, leading edge flaps and other movably held flaps of an aircraft, wherein leading edge flaps may also include slats.

In one exemplary embodiment the high-lift system in each wing half in each case comprises at least one actuator device that is mechanically connected to the transmission shaft and to the high-lift flaps to be moved, wherein the drive unit, when viewed in the direction of the wingspan, is arranged closer to the wing root than a first actuator device. This means that in each wing half a drive unit is arranged in close proximity to the wing root region, and from this drive unit a transmission shaft extends into the wing half and, extending in the direction of the wing tip, a first actuator device and optionally further actuator devices follow on. This arrangement provides an advantage in that the drive unit in question needs to provide only one transmission shaft outlet, which extends to all the actuator devices within a wing half.

In one exemplary embodiment the high-lift system comprises two or more actuator devices, wherein the drive unit, when viewed in the direction of the wingspan, is positioned between a first actuator device and a second actuator device. This arrangement provides an advantage in that an additional transmission shaft from the drive unit to the first actuator device can be done without so that as a result of this it would be possible to save weight.

In one exemplary embodiment the high-lift system according to the present disclosure comprises two control computers that are independent of each other, which are both connected to the left-hand and the right-hand redundant drive unit and are designed to acquire current desired positions and actual positions of high-lift flaps to be moved, and to control the drive unit to equalize the actual positions to the target positions. Acquiring the actual positions can, for example, be achieved by means of position sensors situated on the high-lift flaps, on actuator devices, on the drive units or on the transmission shaft. By inputting target positions, for example by means of a corresponding signal from a pilot, both control computers will control the drive units in such a manner that on the two wing halves the input target positions are attained synchronously.

In one exemplary embodiment a roll compensation unit is connected to the drive units and is designed to equalize differences in lift between the right-hand and the left-hand wing half, in that by means of over-controlling the respective drive unit a balanced differential rolling moment is generated. In this way, mechanical adjustment of landing flaps for roll compensation, which mechanical adjustment is usually carried out following initial functional check flights, can be done without. The roll compensation unit can be designed as a separate unit but at the same time can also be integrated as an algorithm in the control computers.

The present disclosure also provides an aircraft comprising a wing with two wing halves and a high-lift system described above. The aircraft designed in this manner has clear weight advantages when compared to known aircraft comprising conventional high-lift systems, and manufacturing costs are reduced because there is no need to provide angular gear arrangements and the like that are expensive to install.

Furthermore, the present disclosure provides the use in each case of a drive unit and a transmission shaft, in each wing half of an aircraft with a wing, for moving high-lift flaps that are movably arranged on the wing.

Lastly, the present disclosure also provides a method for moving high-lift flaps, movably held on a wing comprising two wing halves, with two drive units arranged in the wing halves, with each drive unit being connected to a transmission shaft that extends into the respective wing half and that is coupled to actuator devices. Such a method according to the present disclosure essentially comprises rotating the transmission shafts; measuring the positions of the high-lift flaps; comparing with a target position; and, when a target position has been reached, stopping the drive units. In one exemplary embodiment of the method any asymmetry is determined by comparing opposite high-lift flaps of the two wing halves, and if there is any asymmetry the drive units are stopped. By superimposing a distance increment on a specified actual position for high-lift flaps of one wing half it is possible to compensate for asymmetry errors due to manufacturing tolerances. To provide roll compensation in the case of malfunctions, for example engine malfunction or control surface malfunction, high-lift flaps on one wing half can deliberately be extended so that they are asymmetrical.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
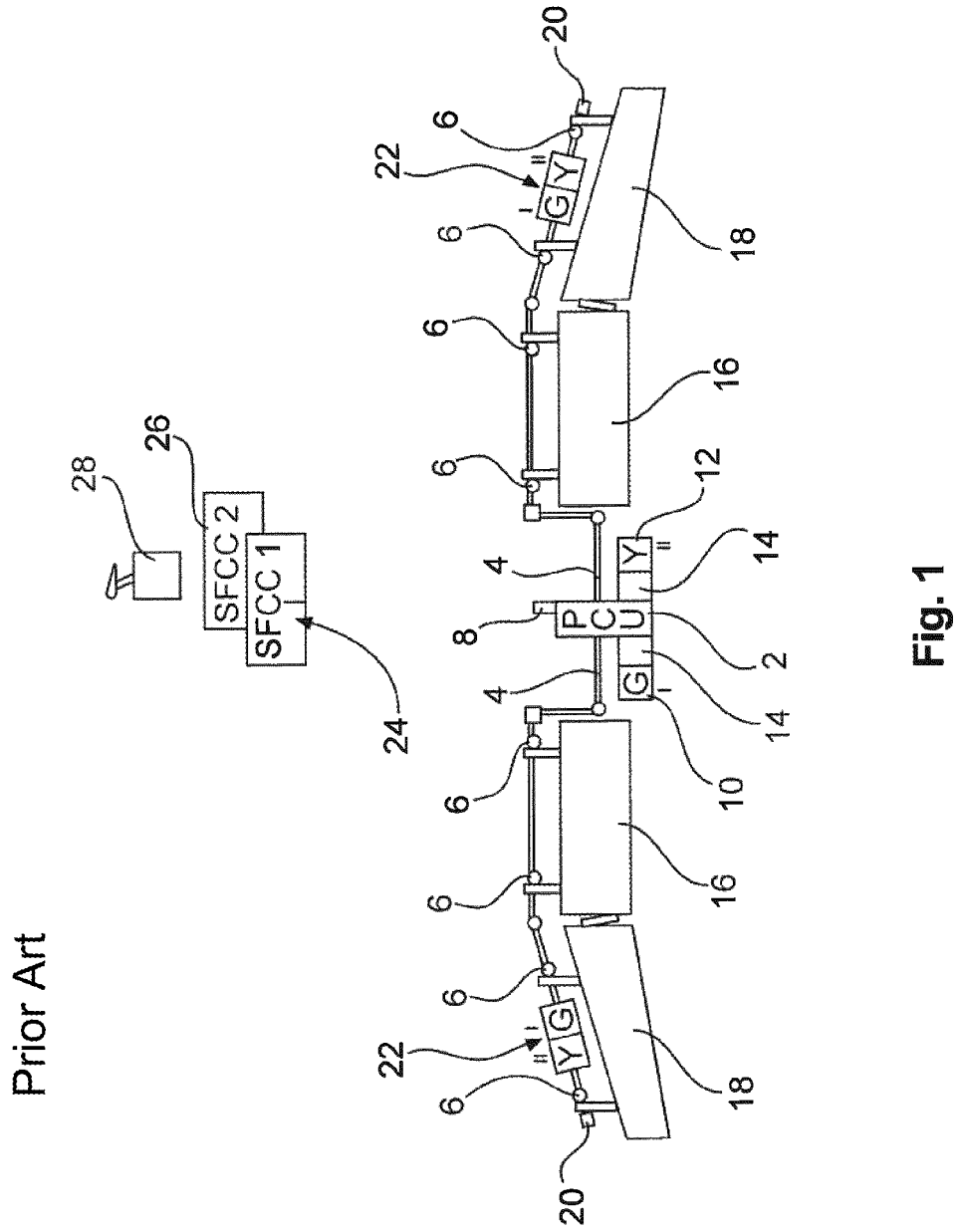
FIG. 1 shows a high-lift system according to the state of the art.

FIG. 1 shows a high-lift system from the state of the art, comprising a central drive unit 2 or power control unit (PCU) which in each case by way of a transmission shaft train 4 is connected to actuator devices 6 in a left-hand wing half and in a right-hand wing half. The central drive unit 2 comprises a position sensor 8 which is also named "feedback position pickoff unit" (FPPU). Furthermore, for reasons of redundancy the central drive unit 2 is driven by two motors that are supplied with power by two different hydraulic systems. As an example FIG. 1 shows a "green" hydraulic system 10 and a "yellow" hydraulic system 12, which in the figures are designated "G" (Green) and "Y" (Yellow). In order to hold the system in the prescribed position and in order to counteract, during the method, any load-induced undesirable rotation of the central drive unit 2 if there is a loss of pressure by one of the hydraulic systems 10 or 12, corresponding pressure loss brakes ("pressure off brakes", POB) 14 are arranged which when pressure is applied are opened, and when pressure drops are closed. For the purpose of monitoring the high-lift system for asymmetries between high-lift flaps 16, which as an example are designed as trailing edge flaps, or between high-lift flaps 18 of two wing halves so-called asymmetry position sensors 20 ("asymmetry position pick-off units" APPU) 20 are used, which are located at the end of each of the transmission shaft trains 4. Furthermore, in the outer regions of each of the wing halves in each case a further wing tip brake ("wing tip brake", WTB) 22 is arranged.

The central drive unit 2 is in connection with two control computers (Slat/Flap Control Computer 1 and Slat/Flap Control Computer 2, SFCC 1, SFCC 2) 24 and 26 which monitor deflection of the flaps 16 and 18 by way of the position sensor 8 and the asymmetry sensors 20, and thereafter control the central drive unit 2. The control computers 24 and 26 obtain the target value to be set, for example by way of an actuating lever 28 that can be operated by a pilot, which actuating lever 28 is connected to the control computers 24 and 26.

Figure 2:
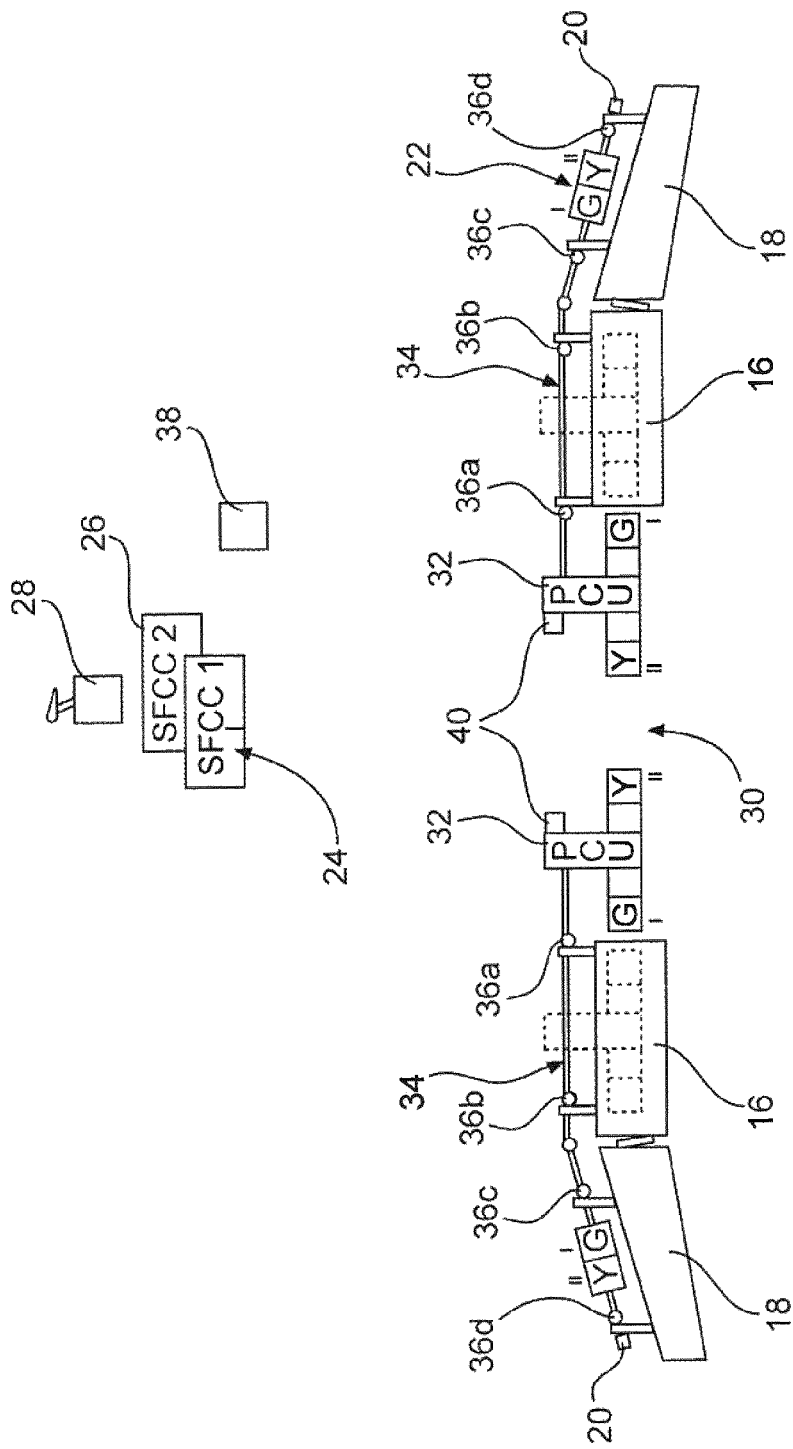
FIG. 2 shows a high-lift system according to the present disclosure.

The high-lift system according to the present disclosure, shown in FIG. 2, differs from the state of the art shown in FIG. 1 in that two separate and mechanically independent drive units 32 that can be operated independently of each other and that are arranged in a region of a wing root 30 are used, with each drive unit 32 by itself supplying mechanical power to a transmission shaft train 34 of a left-hand wing half or of a right-hand wing half, in which wing halves several actuator devices 36a-36d for moving high-lift flaps 16 and 18 are arranged and connected to the respective transmission shaft train 34.

As an example, in FIG. 2 the respective drive unit 32 is arranged in the direction of the wingspan, i.e. from a wing root towards the outside in the extension along the wingspan in front of a first actuator device 36a so that the respective transmission shaft train 34 extends from the respective drive unit 32 to a wing tip through several actuator devices 36a-36d. As an alternative to this, the drive units 32 could be situated between a first actuator device 36a and a second actuator device 36b, as indicated by dashed lines. From the drive unit 32 a shaft piece in the form of a section of a transmission shaft would extend to the first actuator device 36a.

Because of the separation into two drive units 32 that are independent of each other the latter can be dimensioned so that they are significantly smaller than an individual central drive unit 2. Both drive units 32 together should have an overall weight that is only slightly above the weight of an individual central drive unit. By being able to do without a number of shaft joints or angular gear arrangements, since it is not necessary to deflect rotation, in a wing root, of a central drive unit by means of several deflections in several spatial directions to corresponding junctions within a wing, the overall weight of both transmission shafts 34 together is significantly reduced when compared to that of a single centrally controlled transmission shaft train. In the final analysis this results in the overall weight of the design of FIG. 2 being lower than that of FIG. 1.

In addition to the weight advantage it should, in particular, be stressed that by individually controlling the two drive units 32 by way of a roll compensation function in the two control computers 24 and 26 or by way of a separate, additional, roll compensation unit 38, roll compensation can be carried out. This takes place in the form of superimposing distance increments for generating differential rolling moment by means of the high-lift flaps 16 and 18 by way of the individual, specified, actuating distances. In this way, asymmetries due to tolerances in the manufacture of the aircraft can be compensated for, and in the case of engine malfunction this can result in reducing the load on ailerons and rudders, which again provides the primary actuating surfaces of the aircraft with more roll authority for this malfunction state. If there is a generally present reduced roll authority of the actuating surfaces of ailerons and spoilers, due to a malfunction of one or several of these actuating surfaces, by means of roll compensation with the use of the high-lift flaps 16 and 18 controllability of the aircraft can be improved.

By comparing the actual positions supplied by the individual position sensors 40 by means of the control computers 24 and 26, it is possible to detect whether there is any asymmetry between the flaps 16 and 18 of the two wing halves 44 and 46 so that the respective drive unit 32 that moves ahead can be braked in order to counteract defect-induced asymmetries and in so doing counteract roll moment that is to be compensated for by way of ailerons, or to ensure synchronous symmetrical extension. In this process, superimposed distance increments are to be taken into account which are input by the roll compensation unit 38 and which are desirable.

As a result of smaller dimensioning of the drive units 32, doing without all the transmission shaft components plus a wing box to the wing root 30, the weight of the high-lift system according to the present disclosure is lower than that of a high-lift system from the state of the art. Furthermore, as a result of separate control and the integrated option of roll compensation based on the omitted rigid mechanical coupling of the actuator devices of the individual wing halves, additional functions can be carried out which otherwise would have necessitated manual setting, or the like, of the actuator devices.

Figure 3:
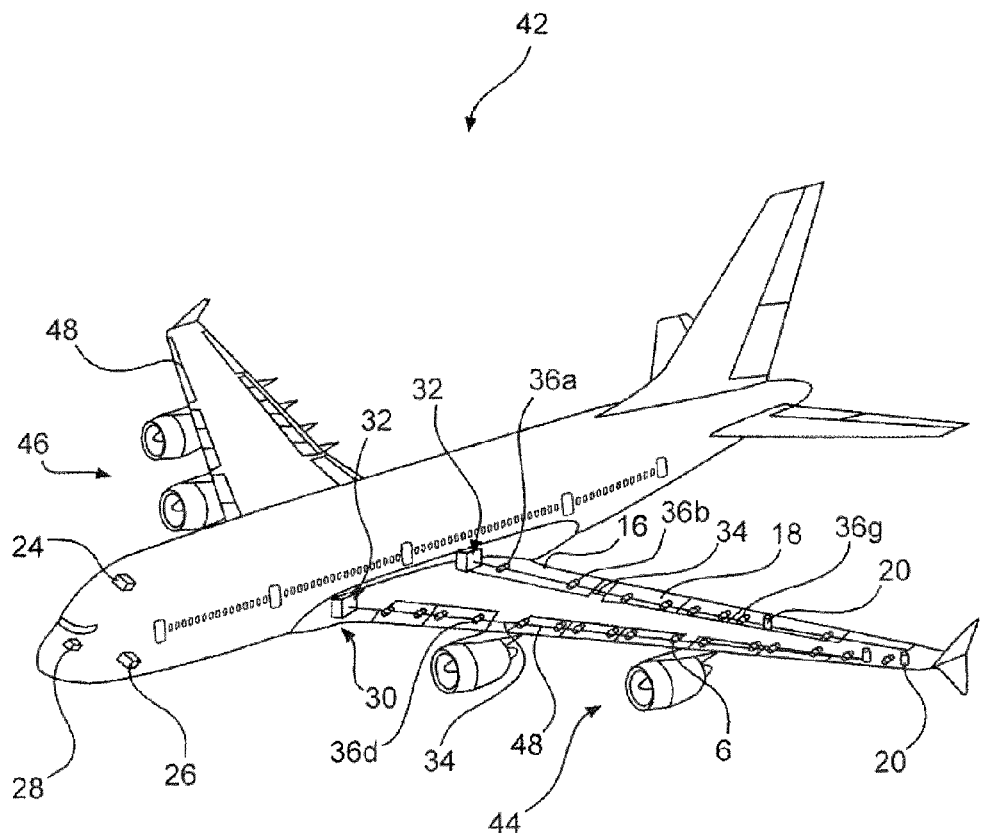
FIG. 3 shows an aircraft with two high-lift systems according to the present disclosure installed therein.

FIG. 3 shows an aircraft 42 with a high-lift system each for articulating leading edge flaps 48 and trailing edge flaps 16 and 18, with each high-lift system comprising two separate drive units 32, each driving an independent transmission shaft train on each wing half 44, 46.

Figure 4:
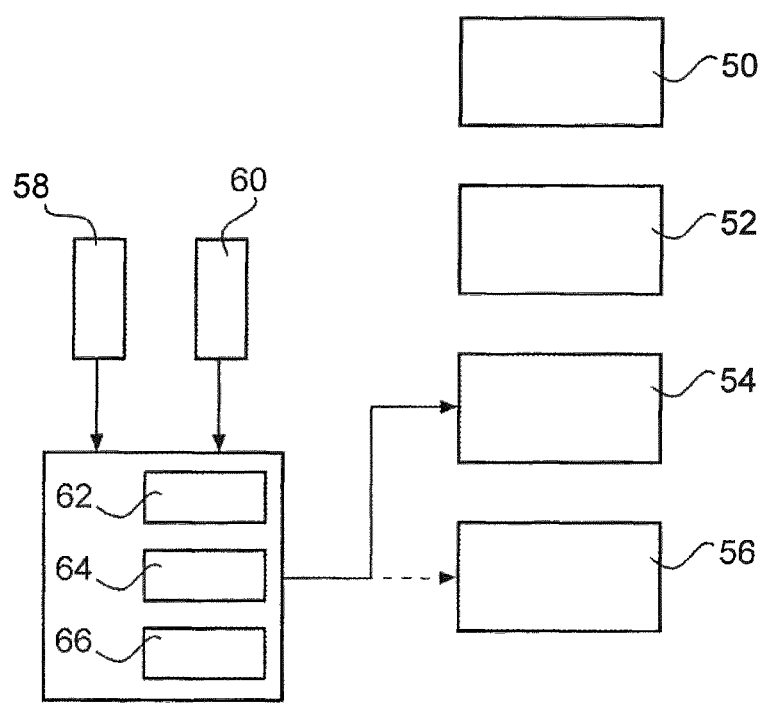
FIG. 4 shows a diagrammatic block-based view of a method according to the present disclosure.

Finally, FIG. 4 shows a representation of a method according to the present disclosure that comprises moving high-lift flaps and the characteristic of roll compensation. By transmitting 50 a movement signal from the control computers 24 and 26 to the individual drive units 32 the drive units 32 are driven, which results in rotation of the transmission shafts 34 and thus movement 52 of the high-lift flaps. After a stop signal has been transmitted 54, stopping 56 of the drive units 34 takes place.

Parallel to this, in order to ensure the correct position of the high-lift flaps and in order to avoid asymmetry errors or the like, measuring 58 of the current position of the high-lift flaps 16 and 18 of the left-hand wing half 44 and measuring 60 of the current position of the high-lift flaps 16 and 18 of the right-hand wing half 46 takes place. Comparing 62 the present positions with target positions provides a result as to whether the transmission shafts 34 have carried out adequate rotation to reach the target positions. When said target position is reached a stop signal is emitted 54, which results in the drive units 32 stopping. Furthermore, because the actual positions of the high-lift flaps 16 and 18 of both wing halves 44 and 46 are available, and by comparing the actual positions of opposite high-lift flaps 16 and 18, it is easily possible to detect 64 any asymmetry in order to then emit 54 a stop signal.

If there is any asymmetry due to tolerances in the manufacture of the aircraft, if asymmetry is desired, or if the primary control surfaces are to be supported, by means of a roll compensation unit 38 a distance increment, i.e. an additional actuating distance, which leads to asymmetry, for particular high-lift flaps of a wing half 44 and 46 is superimposed 66 on the target position so that this does not result in switching a drive unit 32 off as a result of asymmetry.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A high-lift system on a wing of an aircraft, which wing comprises a left-hand wing half with a first plurality of movably held high-lift flaps and a right-hand wing half with a second plurality of movably held high-lift flaps and is attached to an aircraft fuselage thus forming a wing root, comprising:
   a first and a second independently operable drive unit arranged in the left-hand wing half and right-hand wing half, respectively, in a region in close proximity to the wing root, the first and second drive units being joined to a first and a second transmission shaft respectively, the first and second transmission shafts being mechanically coupled to the respective first and second drive units and extending from the first and second drive units in the direction of the end of the left-hand wing half and right-hand wing half respectively and are configured to mechanically move the first and second pluralities of high-lift flaps arranged in the left-hand wing half and right-hand wing half respectively.

2. The high-lift system of claim 1, further comprising at least first and second actuator devices in the left-hand wing half and right-hand wing half, respectively, mechanically connected to the first and second transmission shafts and to the first and second pluralities of high-lift flaps to be moved, wherein the first and second drive units, when viewed in the direction of the wingspan, are arranged closer to the wing root than the at least first and second actuator devices.

3. The high-lift system of claim 1, further comprising two or more actuator devices, wherein the drive unit, when viewed in the direction of the wingspan, is arranged between a first actuator device and a second actuator device.

4. The high-lift system of claim 1, further comprising first and second control computers that are independent of each other, which are both connected to the first and second drive units, and are configured to acquire current desired positions and actual positions of the high-lift flaps to be moved and to control the respective drive unit to equalize the actual positions to the target positions.

5. The high-lift system of claim 1, further comprising a roll compensation unit connected to the drive units and configured to superimpose differential rolling moments by a difference in the actuating distance from respective target positions.

6. An aircraft, comprising:
   a fuselage;
   a wing with a left-hand wing half and a right-hand wing half that are each attached to the fuselage to form a wing root;
   a first plurality of high-lift flaps movably coupled to the left-hand wing half and a second plurality of high-lift flaps movably coupled to the right-hand wing half; and
   a first and a second independently operable drive unit arranged in the left-hand wing half and right-hand wing half, respectively, in a region in close proximity to the wing root, the first and second drive units being joined to a first and a second transmission shaft, respectively, the first and second transmission shafts coupled to the first and second drive units, respectively, and extending from the first and second drive units in the direction of the end of the left-hand wing half and right-hand wing half and are configured to mechanically move the first and the second pluralities of high-lift flaps arranged in the left-hand wing half and right-hand wing half, respectively.

7. The aircraft of claim 6, further comprising at least first and second actuator devices in the left-hand wing half and right-hand wing half, respectively, mechanically connected to the first and second transmission shafts and to the first and second pluralities of high-lift flaps to be moved, wherein the first and second drive units, when viewed in the direction of the wingspan, are arranged closer to the wing root than the at least first and second actuator devices.

8. The aircraft of claim 6, further comprising two or more actuator devices, wherein the drive unit, when viewed in the direction of the wingspan, is arranged between a first actuator device and a second actuator device.

9. The aircraft of claim 6, further comprising first and second control computers that are independent of each other, which are both connected to the first and second drive units, and are configured to acquire current desired positions and actual positions of the high-lift flaps to be moved and to control the respective drive unit to equalize the actual positions to the target positions.

10. The aircraft of claim 6, further comprising a roll compensation unit that is connected to the drive units and that is designed to superimpose differential rolling moments by means of a difference in the actuating distance from respective target positions.

11. The high-lift system of claim 1, wherein the first drive unit is mechanically coupled exclusively to the first transmission shaft, and
wherein the second drive unit is mechanically coupled exclusively to the second transmission shaft.

* * * * *